(12) United States Patent
Sholingar et al.

(10) Patent No.: US 10,853,670 B2
(45) Date of Patent: Dec. 1, 2020

(54) ROAD SURFACE CHARACTERIZATION USING POSE OBSERVATIONS OF ADJACENT VEHICLES

(71) Applicant: Ford Global Technologies, LLC, Dearborn, MI (US)

(72) Inventors: Gautham Sholingar, Sunnyvale, CA (US); Jinesh J Jain, Palo Alto, CA (US); Gintaras Vincent Puskorius, Novi, MI (US); Leda Daehler, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 57 days.

(21) Appl. No.: 16/198,334

(22) Filed: Nov. 21, 2018

(65) Prior Publication Data
US 2020/0160070 A1     May 21, 2020

(51) Int. Cl.
| | |
|---|---|
| *G06K 9/00* | (2006.01) |
| *G01C 22/00* | (2006.01) |
| *G06N 3/04* | (2006.01) |
| *G06T 7/73* | (2017.01) |
| *G06K 9/62* | (2006.01) |

(Continued)

(52) U.S. Cl.
CPC ....... *G06K 9/00805* (2013.01); *G05D 1/0214* (2013.01); *G05D 1/0246* (2013.01); *G06K 9/627* (2013.01); *G06K 9/6256* (2013.01); *G06N 3/0445* (2013.01); *G06N 3/0454* (2013.01); *G06T 7/74* (2017.01); *G05D 1/0088* (2013.01); *G05D 1/0221* (2013.01);

*G05D 1/0257* (2013.01); *G05D 1/0276* (2013.01); *G06T 2207/10016* (2013.01); *G06T 2207/20081* (2013.01); *G06T 2207/20084* (2013.01)

(58) Field of Classification Search
USPC ....... 382/100, 103–108, 155, 168, 173, 181, 382/199, 219, 224, 232, 254, 274, 276, 382/285–291, 305, 312; 701/1, 23; 706/21
See application file for complete search history.

(56) References Cited

U.S. PATENT DOCUMENTS

| | | | |
|---|---|---|---|
| 7,308,432 B2 * | 12/2007 | Torii | B60G 17/0162 706/21 |
| 9,330,571 B2 | 5/2016 | Ferguson | |
| 9,460,622 B1 | 10/2016 | Ferguson | |

(Continued)

FOREIGN PATENT DOCUMENTS

DE     102013208521 A1     11/2014

*Primary Examiner* — Seyed H Azarian
(74) *Attorney, Agent, or Firm* — David R. Stevens; Stevens Law Group

(57) ABSTRACT

A computing system can crop an image based on a width, height and location of a first vehicle in the image. The computing system can estimate a pose of the first vehicle based on inputting the cropped image and the width, height and location of the first vehicle into a deep neural network. The computing system can then operate a second vehicle based on the estimated pose. The computing system may train a model to identify a type and a location of a hazard according to the estimated pose, the hazard being such things as ice, mud, pothole, or other hazard. The model may be used by an autonomous vehicle to identify and avoid hazards or to provide drive assistance alerts.

17 Claims, 8 Drawing Sheets

(51) Int. Cl.
  *G05D 1/02* (2020.01)
  *G05D 1/00* (2006.01)

(56) References Cited

U.S. PATENT DOCUMENTS

| | | |
|---|---|---|
| 9,652,980 B2 | 5/2017 | Zhang |
| 9,902,401 B2 | 2/2018 | Stein |
| 2004/0162644 A1* | 8/2004 | Torii ................. B62D 6/00 701/1 |
| 2017/0364776 A1* | 12/2017 | Micks ............... G01S 13/006 |
| 2018/0101177 A1* | 4/2018 | Cohen ............... H04N 7/181 |
| 2018/0322783 A1* | 11/2018 | Toyoda .............. G06T 19/006 |

* cited by examiner

ROAD SURFACE CHARACTERIZATION USING POSE OBSERVATIONS OF ADJACENT VEHICLES

BACKGROUND

Field of the Invention

This invention relates to obstacle identification for purposes of autonomous driving or providing driver assistance.

Background of the Invention

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway. There are existing mechanisms to identify objects that pose risk of collision and/or should be taken into account in planning a vehicle's path along a route. However, there is room to improve object identification and evaluation technologies.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
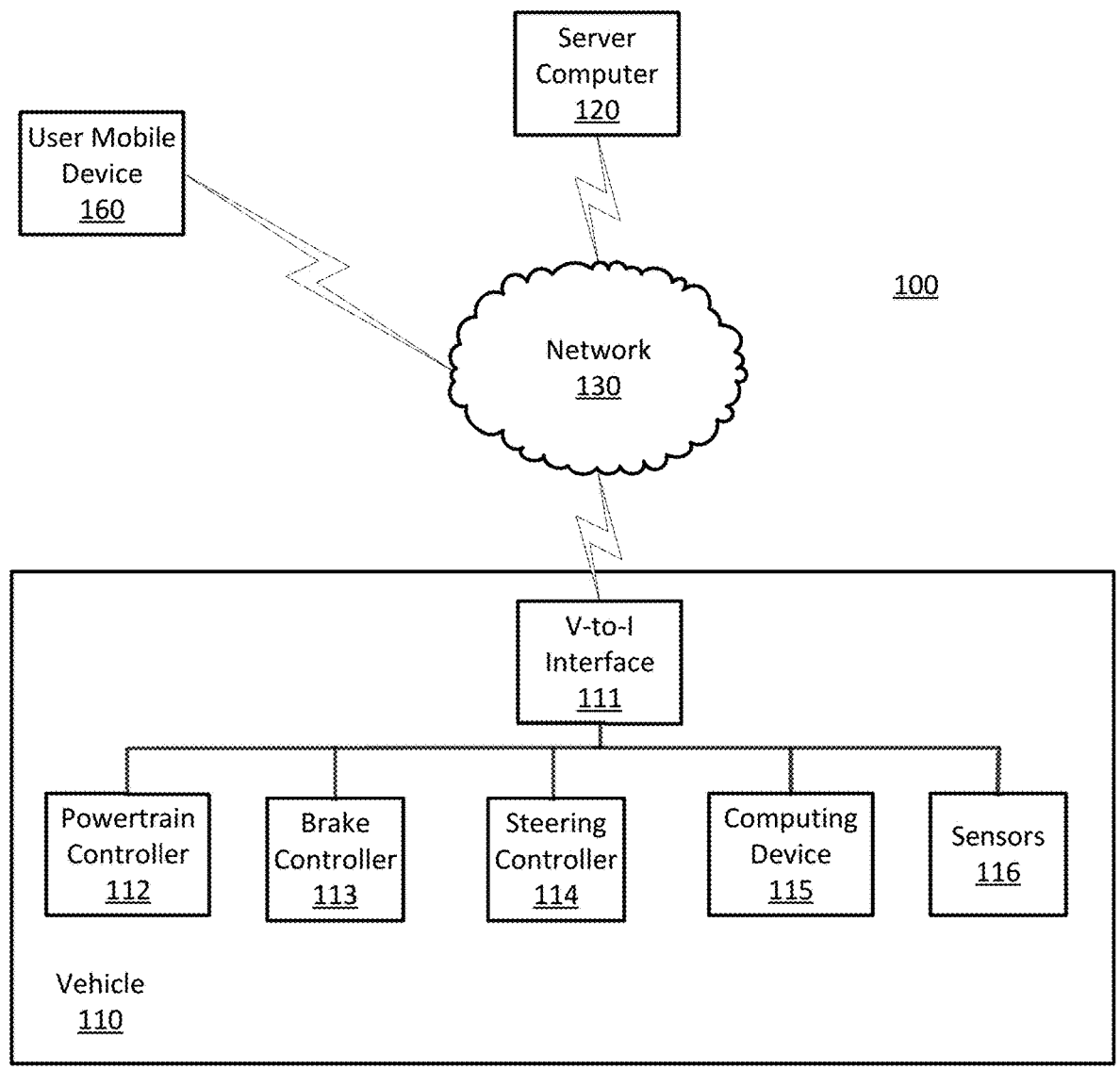
FIG. 1 is a block diagram of an example vehicle.

A computing device in a vehicle can be programmed to acquire data regarding the external environment around a vehicle and to use the data to determine trajectories to be used to operate the vehicle in autonomous and semi-autonomous modes. The computing device can detect and track traffic objects in an environment around a vehicle, where a traffic object is defined as a rigid or semi-rigid three-dimensional (3D) solid object occupying physical space in the real world surrounding a vehicle. Examples of traffic objects include vehicles and pedestrians, etc., as discussed below in relation to FIG. 2. Detecting and tracking traffic objects can include determining a plurality of estimates of the location of a traffic object with respect to the vehicle to determine motion and thereby predict future locations of traffic objects and thereby permit computing device to determine a path for the vehicle to travel that avoids a collision or other undesirable event involving the traffic object. The computing device can use a lidar sensor as discussed below in relation to FIG. 1 to determine distances to traffic objects in a vehicle's environment, however, a plurality of lidar data samples over time can be required to estimate a trajectory for the traffic object and predict a future location. Techniques discussed herein can estimate a 3D location and orientation as defined in relation to FIG. 2, below, in real world coordinates for traffic objects in a vehicle's environment and thereby permit a computing device to predict a future location for a traffic object based on a color video image of the vehicle's environment.

Disclosed herein is a method, including cropping an image based on a width, height and center of a first vehicle in the image to determine an image patch, estimating a 3D pose of the first vehicle based on inputting the image patch and the width, height and center of the first vehicle into a deep neural network, and, operating a second vehicle based on the estimated 3D pose. The estimated 3D pose can include an estimated 3D position, an estimated roll, an estimated pitch and an estimated yaw of the first vehicle with respect to a 3D coordinate system. The width, height and center of the first vehicle image patch can be determined based on determining objects in the image based on segmenting the image. Determining the width, height and center of the first vehicle can be based on determining a rectangular bounding box in the segmented image. Determining the image patch can be based on cropping and resizing image data from the rectangular bounding box to fit an empirically determined height and width. The deep neural network can include a plurality of convolutional neural network layers to process the cropped image, a first plurality of fully-connected neural network layers to process the height, width and location of the first vehicle and a second plurality of fully-connected neural network layers to combine output from the convolutional neural network layers and the first fully-connected neural network layers to determine the estimated pose.

Determining an estimated 3D pose of the first vehicle can be based on inputting the width, height and center of the first vehicle image patch into the deep neural network to determine estimated roll, an estimated pitch and an estimated yaw. An estimated 3D pose of the first vehicle can be determined wherein the deep neural network includes a third plurality of fully-connected neural network layers to process the height, width and center of the first vehicle image patch to determine a 3D position. The deep neural network can be trained to estimate 3D pose based on an image patch, width, height, and center of a first vehicle and ground truth regarding the 3D pose of a first vehicle based on simulated image data. Ground truth regarding the 3D pose of the first vehicle can include a 3D position, a roll, a pitch and a yaw with respect to a 3D coordinate system. The deep neural network can be trained to estimate 3D pose based on an image patch, width, height, and center of a first vehicle and ground truth regarding the 3D pose of a first vehicle based on recorded image data and acquired ground truth. The recorded image data is can be recorded from video sensors included in the second vehicle. The ground truth corresponding to the recorded image data can be determined based on photogrammetry. Photogrammetry can be based on determining a dimension of a vehicle based on the vehicle make and model. In other embodiments, LIDAR, RADAR or other sensor data may be captured and used to determine the actual pose of the vehicle for use as the ground truth. In other embodiments, sensor data (photographic, LIDAR, RADAR, etc.) from an adjacent vehicle observing the vehicle may be used to represent the ground truth for the vehicle.

Further disclosed is a computer readable medium, storing program instructions for executing some or all of the above method steps. Further disclosed is a computer programmed for executing some or all of the above method steps, including a computer apparatus, programmed to crop an image based on a width, height and center of a first vehicle in the image to determine an image patch, estimate a 3D pose of the first vehicle based on inputting the image patch and the width, height and center of the first vehicle into a deep neural network, and, operate a second vehicle based on the estimated 3D pose. The estimated 3D pose can include an estimated 3D position, an estimated roll, an estimated pitch and an estimated yaw of the first vehicle with respect to a 3D coordinate system. The width, height and center of the first vehicle image patch can be determined based on determining objects in the image based on segmenting the image. Determining the width, height and center of the first vehicle can be based on determining a rectangular bounding box in the segmented image. Determining the image patch can be based on cropping and resizing image data from the rectangular bounding box to fit an empirically determined height and width. The deep neural network can include a plurality of convolutional neural network layers to process the cropped image, a first plurality of fully-connected neural network layers to process the height, width and location of the first vehicle and a second plurality of fully-connected neural network layers to combine output from the convolutional neural network layers and the first fully-connected neural network layers to determine the estimated pose.

The computer apparatus can be further programmed to determine an estimated 3D pose of the first vehicle can be based on inputting the width, height and center of the first vehicle image patch into the deep neural network to determine estimated roll, an estimated pitch and an estimated yaw. An estimated 3D pose of the first vehicle can be determined wherein the deep neural network includes a third plurality of fully-connected neural network layers to process the height, width and center of the first vehicle image patch to determine a 3D position. The deep neural network can be trained to estimate 3D pose based on an image patch, width, height, and center of a first vehicle and ground truth regarding the 3D pose of a first vehicle based on simulated image data. Ground truth regarding the 3D pose of the first vehicle can include a 3D position, a roll, a pitch and a yaw with respect to a 3D coordinate system. The deep neural network can be trained to estimate 3D pose based on an image patch, width, height, and center of a first vehicle and ground truth regarding the 3D pose of a first vehicle based on recorded image data and acquired ground truth. The recorded image data is can be recorded from video sensors included in the second vehicle. The ground truth corresponding to the recorded image data can be determined based on photogrammetry. Photogrammetry can be based on determining a dimension of a vehicle based on the vehicle make and model.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode. Vehicle 110 also includes one or more computing devices 115 for performing computations for piloting the vehicle 110 during autonomous operation. Computing devices 115 can receive information regarding the operation of the vehicle from sensors 116. The computing device 115 may operate the vehicle 110 in an autonomous mode, a semi-autonomous mode, or a non-autonomous mode. For purposes of this disclosure, an autonomous mode is defined as one in which each of vehicle 110 propulsion, braking, and steering are controlled by the computing device; in a semi-autonomous mode the computing device 115 controls one or two of vehicle's 110 propulsion, braking, and steering; in a non-autonomous mode, a human operator controls the vehicle propulsion, braking, and steering.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, Bluetooth® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller is typically an electronic control unit (ECU) or the like such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front, e.g., a front bumper (not shown), of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based semi-autonomous and/or autonomous-capable vehicle 110 having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
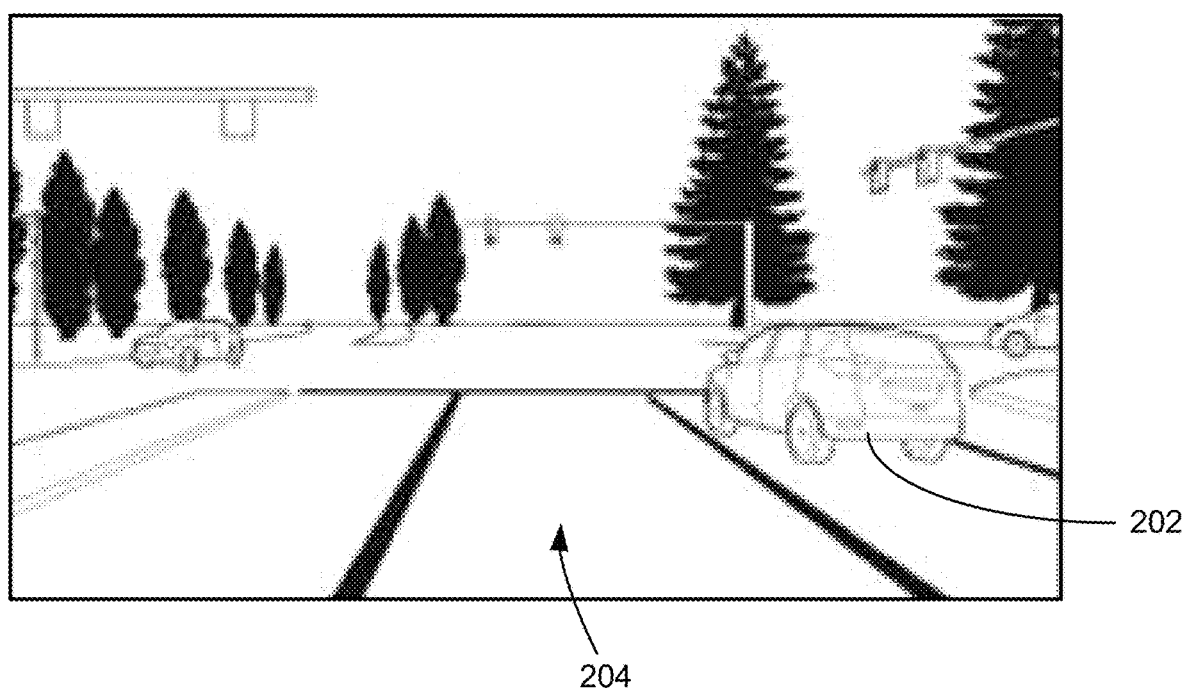
FIG. 2 is a diagram of an example image of a traffic scene.

FIG. 2 is a diagram of an example color image 200 of a traffic scene rendered in black and white to comply with 37 C.F.R. § 1.84(a)(1). Color image 200 can be acquired by a video sensor 116 included in a vehicle 110. Video sensor 116 can acquire color video data and transmit the color video data to computing device 115, which can store the color video data in non-volatile memory where it can be recalled by computing device 115 and processed. As discussed above in regard to FIG. 1, computing device 115 can be programmed to operate vehicle 110 based, in part, on color video data from a video sensor 116. Computing device 115 can be programmed to recognize traffic objects in color image 200 including other vehicle 202 and roadway 204. For example, a deep neural network (DNN) can be programmed to segment and categorize traffic objects including vehicles, pedestrians, barriers, traffic signals, traffic markings, roadways, foliage, terrain and buildings. Applying DNNs to segment traffic objects in color video data is the subject of current academic and industrial research. Academic research groups and some commercial entities have developed libraries and toolkits that can be used to develop DNNs for image segmentation tasks, including traffic object segmentation. For example, Caffe is a convolutional neural network library created by Berkeley Vision and Learning Center, University of California, Berkeley, Berkeley, Calif. 94720, that can be used to develop a traffic object segmentation DNN.

Image segmentation is a machine vision process wherein an input color image is segmented into connected regions. A DNN can be trained to segment an input color image into connected regions by inputting a plurality of color images along with "ground truth" data. Ground truth is defined as information or data specifying a real world condition or state associated with image data. For example, in an image of a traffic scene, ground truth data can include information on traffic objects included in the color image, such as area and distance and direction from the color video sensor 116 to a vehicle in the field of view. Ground truth data can be acquired independently from the color image, for example by direct observation or measurement, or by processing that is independent from the DNN processing. Ground truth data can be used to provide feedback to the DNN during training, to reward correct results and punish bad results. In other embodiments, LIDAR, RADAR or other sensor data may be captured and used to determine the actual pose of the vehicle for use as the ground truth. In other embodiments, sensor data (photographic, LIDAR, RADAR, etc.) from an adjacent vehicle observing the vehicle may be used to represent the ground truth for the vehicle.

By performing a plurality of trials with a plurality of different DNN parameters and assessing the results with ground truth data, a DNN can be trained to output correct results upon inputting color image data. The connected regions can be subject to minimum and maximum areas, for example. The connected regions can be categorized by labeling each connected region with one of a number of different categories corresponding to traffic objects. The categories can be selected by the DNN based on the size, shape, and location of the traffic objects in color image 200. For example, a DNN can include different categories for different makes and models of vehicles.

Training a DNN to determine a 3D pose of a vehicle in an input color image 200 can require recorded color images 200 with corresponding ground truth regarding the real world 3D pose of a plurality of vehicles. Ground truth can be expressed as distance or range and direction from a color video sensor 116. In some examples, computing device 115 can determine a distance or range from the color video sensor 116 to a traffic object in color image 200 by photogrammetry (i.e., techniques such as are known for making measurements from photographs or images). Photogrammetry can combine information regarding a field of view including magnification, locations and three-dimensional (3D) optical axis direction of a lens of a color video sensor 116 with information regarding real world size of a traffic object to estimate the distance and direction from a lens of a color video sensor 116 to a traffic object. For example, information regarding the real world height of other vehicle 202 can be combined with color image 200 height information in pixels of a traffic object associated with other vehicle 202, and based on the magnification and 3D direction of the lens, determine a distance and direction to the other vehicle 202 with respect to vehicle 110.

Determining distances and directions based on photogrammetry depends upon determining location and pose of traffic objects. Traffic objects are assumed to be rigid 3D objects (vehicles, etc.) or semi-rigid 3D objects (pedestrians, etc.); therefore traffic object position and orientation in real world 3D space can be described by six degrees of freedom about a three-axis coordinate system. Assuming an x, y, z three-axis coordinate system with a defined origin, 3D location can be defined as translation from the origin in x, y, z coordinates and pose can be defined as angular rotations (roll, pitch and yaw) about the x, y, and z axes respectively. Location and pose can describe, respectively, the position and orientation (e.g., angles with respect to each of x, y, and z axes, possibly expressed, e.g., with respect to a vehicle, as a roll, pitch, and yaw) of traffic objects in real world 3D space. Estimates of roll, pitch, and yaw for a traffic object are referred to as a predicted orientation. An orientation combined with a 3D location will be referred to as 3D pose herein, and a predicted orientation combined with a predicted 3D location will be referred to as predicted 3D pose herein.

Photogrammetry can determine the location of a data point in a color image 200, for example, and based on information regarding the field of view of the color video sensor 116 that acquired the color image 200 and an estimate of the distance from a 3D point in the color video sensor to the data point in real world 3D space. For example, the distance from the 3D point in the color video sensor to the data point in real world 3D space can be estimated using a priori information regarding the data point. For example, the data point can be assumed to be included in a categorized traffic object identified, e.g., according to conventional object recognition and/or classification techniques, by computing device 115 from data of one or more sensors 116. The traffic object category can be used by computing device 115 to recall a priori information regarding the real world (i.e., actual) size of the traffic object. A real world size of a traffic object can be defined as the size of a measurable dimension, for example overall height, length or width. For example, passenger vehicles are manufactured at standard dimensions. An image of a make and model of passenger vehicle can be recognized by computing device 115 using machine vision techniques and based on measurable dimensions of that vehicle in real world units, for example millimeters, that can be recalled from a list of vehicle measurable dimensions stored at computing device 115. The size of the measurable dimension as measured in pixels in the color image can be compared to a size of the measurable dimension in real world units to determine a distance of the traffic object from the color video sensor 116 based on the magnification of a lens included in the color video sensor 116 and a location of the measurable dimension with respect to an intersection of an optical axis included in the lens and an image sensor plane included in a color video sensor 116 for example. A priori information regarding a measurable dimension can be combined with measured locations and sizes of traffic objects in color image 200 and information regarding the magnification of the color video sensor 116 lens in this fashion to estimate a real world 3D distance from the color video sensor to the categorized traffic object.

In some examples, computing device can determine a distance or range from a color video sensor 116 to a traffic object in color image 200 by acquiring and processing information from a lidar sensor 116. As discussed above in relation to FIG. 1, a lidar sensor 116 can acquire a point cloud of data points that represent locations of surfaces in 3D space. A location of the other vehicle 302 with respect to vehicle 110 can be determined by projecting an estimated 3D location of a 3D lidar data point determined to be associated with other vehicle 302 into color image 300 based on the field of view of color image sensor 116. A 3D lidar data point can be determined to be associated with the other vehicle by based on comparing the fields of view of color image sensor 116 and lidar sensor 116.

Figure 3:
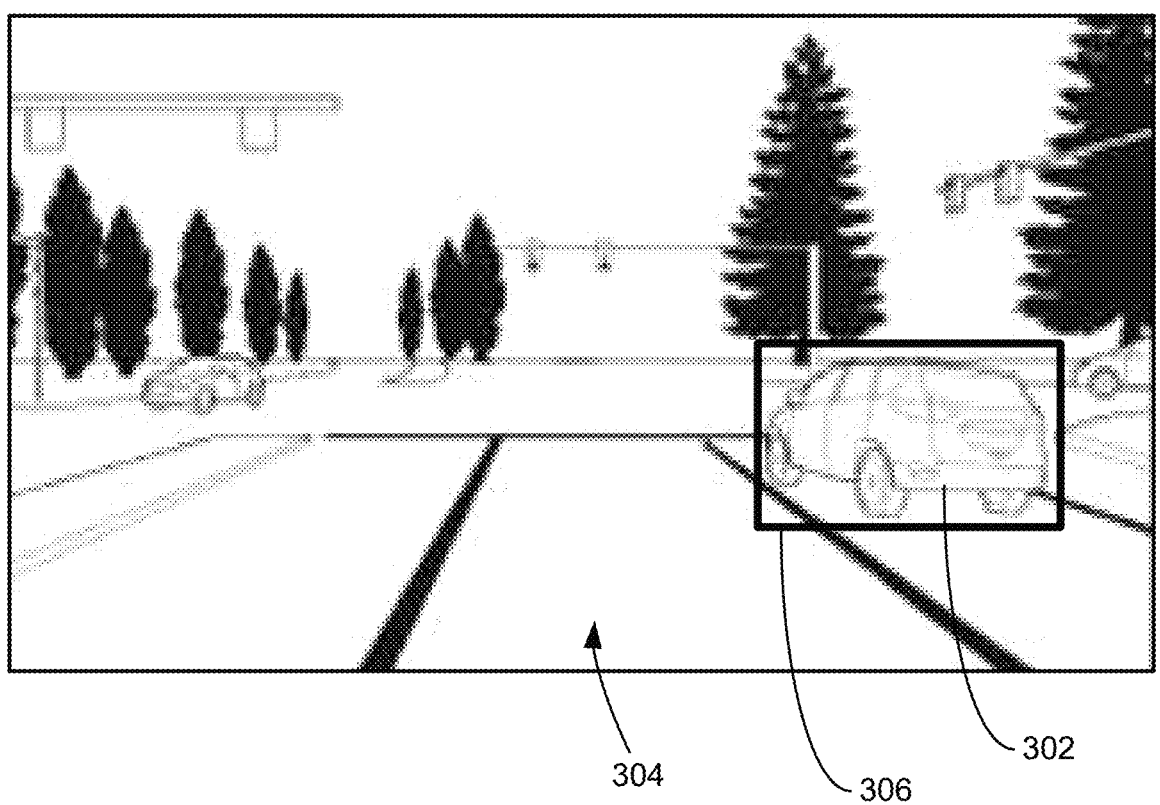
FIG. 3 is a diagram of an example image of a traffic scene.

FIG. 3 is an example color image 300 of a traffic scene rendered in black and white. Computing device 115 can be programmed to recognize traffic objects in color image 300 including other vehicle 302 and roadway 304 as discussed above in relation to FIG. 2. Based on traffic object data associated with other vehicle 302, a rectangular bounding box 306 can be constructed around other vehicle 302.

Bounding box 306 can be constructed based on segmented traffic object data from color image data 300. Based on determining a traffic object with category "vehicle" at a location in color image 300 consistent with other vehicle 302, computing device 115 can construct a bounding box by determining the smallest rectangular shape that includes image pixels in a connected region of color image 300 determined to belong the category "vehicle," wherein the sides of the bounding box are constrained to be parallel to the sides (top, bottom, left, right) of color image 300. Bounding box 306 is described by contextual information including a center, which is expressed as x, y coordinates in pixels relative to an origin, a width in pixels and a height in pixels. The x, y coordinates of a center can be the center of the bounding box. The height and width of the bounding box can be determined by the maximum and minimum x and maximum and minimum y coordinates of pixels included in the connected region.

Color image 300 can be cropped based on bounding box 306. In cropping, all pixels of color image 300 that are not within bounding box 306 are discarded. Color image 300 then includes only the pixels within bounding box 306. Since bounding box 306 includes many fewer pixels than original, uncropped color image 300, processing of cropped color image 300 can be many times faster, thereby improving processing related to predicting a 3D pose.

Cropped color image 300 and contextual information regarding the location and size of the cropped color image 300 with respect to original, uncropped color image 300 can be input to a DNN, described in relation to FIG. 4, below, to determine a pose prediction, i.e., estimated roll, pitch and yaw, for other vehicle 302. A pose prediction can be used by computing device 115 to predict movement for other vehicle 302 and thereby assist computing device 115 in safely and efficiently operating vehicle 110 by avoiding collisions and near-collisions and traveling a shortest path consistent with safe operation.

Figure 4:
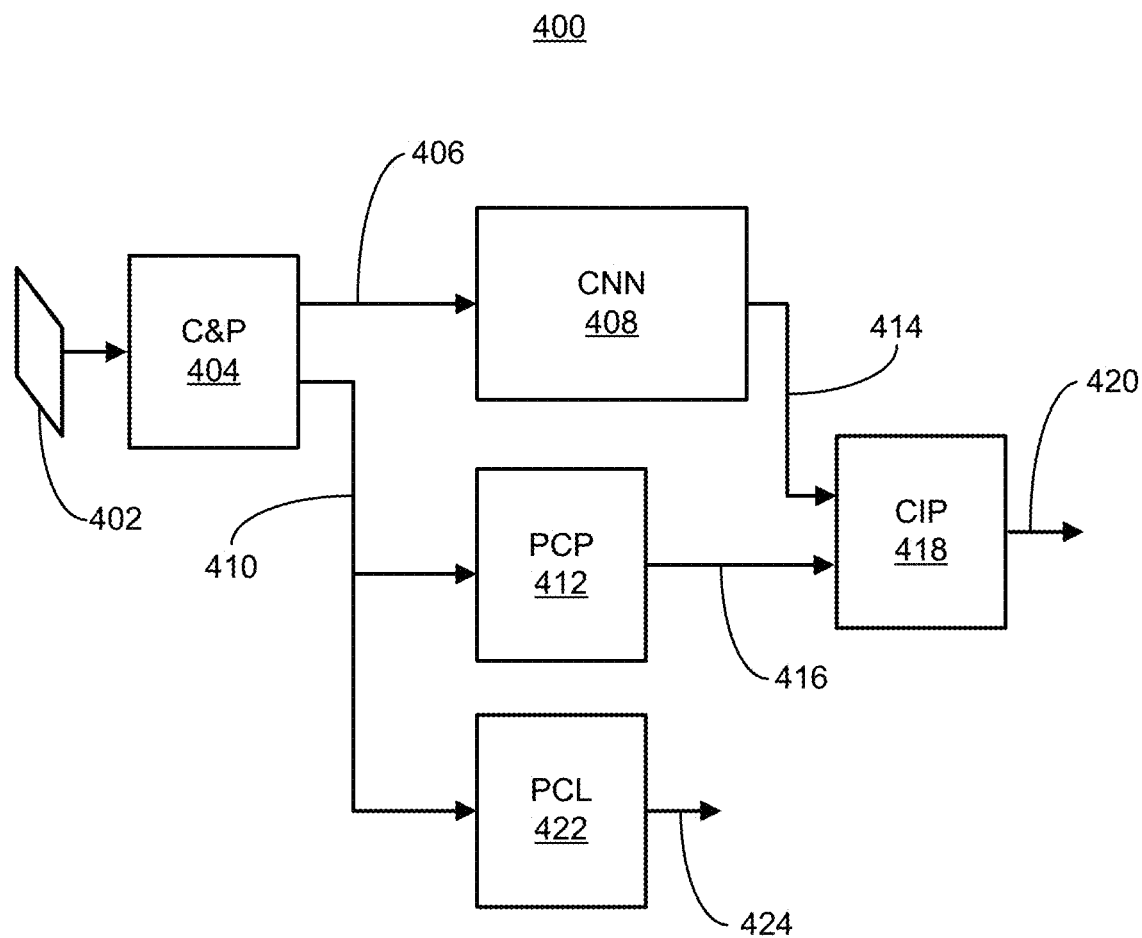
FIG. 4 is a diagram of an example deep neural network.

FIG. 4 is a diagram of an example pose prediction DNN 400, i.e., a machine learning program that can be trained to output predicted orientation 420 and predicted position 424 in response to an input color image 402. A predicted orientation 420 and a predicted position 424 is a prediction or estimation of a real world 3D pose (location, roll, pitch, and yaw) as defined above in relation to FIG. 2, predicted from analysis of an image of another vehicle included in input color video image 402. DNN 400 can output a location prediction 424 in response to an input color image 402. A location prediction is a real world 3D location (x, y, z) as defined above in relation to FIG. 2, predicted from an image of the other vehicle included in input color video image 402. DNN 400 can be trained based on a plurality of input color images that include ground truth specifying the real world 3D location and pose of vehicles included in the input color images. Training DNN 400 includes inputting a color image 402, and back-propagating a resulting output pose prediction 420 to be compared to ground truth associated with an input color image 402.

As defined above, ground truth can be the correct real world 3D pose for the vehicle pictured in color image 402 determined with respect to a color video sensor 116 included in vehicle 110. Ground truth information can be obtained from a source independent of color image 402. For example, the 3D pose of another vehicle with respect to a color video sensor 116 can be physically measured and then a color image 402 of the other vehicle can be acquired and the ground truth and the acquired image used for training DNN 400. In other examples, simulated data can be used to create color image 402. In this example the 3D pose is input to a simulation program. Simulated data can be created by software programs similar to video game software programs that can render output video images photo-realistically, e.g. the output video images look like photographs of real world scenes.

By comparing results of DNN 400 processing with ground truth and positively or negatively rewarding the process, the behavior of DNN 400 can be influenced or trained after repeated trials to provide correct answers with respect to ground truth when corresponding color images 402 are input for a variety of different color images 402. Training DNN 400 in this fashion trains component neural networks convolutional neural network (CNN) block 408 and process crop pose (PCP) block 412, to output correct image features 414 and correct pose features 416, respectively, as input to combine image pose CIP block 418 in response to input color image 402, without explicitly having to provide ground truth for these intermediate features. Ground truth regarding orientation prediction 420 and location prediction 424 is compared to output from combine image pose (CIP) block and process crop location (PCL) block 422 to train DNN 400.

As the first step in processing a color image 402 with DNN 400, computing device 115 can input a color image 402 to crop and pad (C&P) block 404 wherein a color video image 402 is cropped, resized and padded. A color image 402 can be cropped by determining a bounding box associated with an image of a vehicle and discarding all pixels outside of the bounding box, as discussed above in relation to FIG. 3. The resulting cropped color image can have a height and width in pixels that is different than an input height and width required by CNN block 408. To remedy this, the cropped color image can be resized by expanding or contracting the cropped color image until the height and width or cropped color image is equal to an input height and width required by CNN block 408, for example 100×100 pixels. The cropped color image can be expanded by replicating pixels and can be contracted by sampling pixels. Spatial filters can be applied while expanding and contracting the cropped color image to improve accuracy. The cropped color image can also be padded by adding rows and columns of pixels along the top, bottom, left and right edges of the cropped and resized color image to improve the accuracy of convolution operations performed by CNN block 408. The cropped, resized and padded color image 406 is output to CNN block 408.

CNN block 408 processes cropped, resized, and padded color image 406 by convolving the input cropped, resized and padded color image 406 successively with a plurality of convolution layers using a plurality of convolution kernels followed by pooling, wherein intermediate results output from a convolutional layer can be spatially reduced in resolution by combining contiguous neighborhoods of pixels, for example 2×2 neighborhoods, into a single pixels according to a rule, for example determining a maximum or a median value of the neighborhood pixels. Intermediate results from a convolutional layer can also be spatially expanded by including information from previously determined higher resolution convolutional layers via skip connections, for example. CNN block 408 can be trained by determining sequences of convolution kernels to be used by convolutional layers of CNN block 408 based on comparing results from DNN 400 with ground truth regarding vehicle orientation and location. CNN block 408 outputs image features 414 to CIP block 418, where they are combined with pose features 416 output by PCP block 412 to form output orientation predictions 420.

Returning to C&P block 404, C&P block 404 outputs crop information 410 based on input color image 402 to PCP block 412 and PCL block 422. Crop information includes the original height and width of the cropped color image in pixels and the x, y coordinates of the center of the cropped color image with respect to the origin of the color image 402 coordinate system in pixels. PCP block 412 inputs the crop information 410 into a plurality of fully-connected neural network layers, which process the crop information 410 to form orientation features 416 to output to CIP 418. At training time, parameters included as coefficients in equations included in PCP 412 that combine values in fully-connected layers form output orientation features 416, can be adjusted or set to cause PCP 412 output desired values based on ground truth. In parallel with this, PCL 422 inputs the crop information and determines a real world 3D location for the vehicle represented in cropped, resized and padded color image 406 to output as location prediction 424, which includes x, y, and z coordinates representing an estimate of the real world 3D location of the vehicle represented in input color image 402. PCL 422 can be trained by adjusting or setting parameters included as coefficients in equations included in PCL 422 that combine values in fully-connected layers to output correct values in response to cropped image input based on ground truth.

CIP block 418 inputs image features 414 and orientation features 416 into a plurality of fully connected neural network layers to determine an orientation prediction 420. Orientation prediction 420 is an estimate of the orientation of a vehicle represented in input color image 402 expressed as roll, pitch, and yaw, in degrees, about the axes of a camera 3D coordinate system as described above in relation to FIG. 2. At training time, parameters included as coefficients in equations included in CIP block 418 that combine values in fully-connected layers form output orientation predictions 420, can be adjusted or set to cause CIP 418 to output desired values based on ground truth. An orientation prediction 420 and a location prediction 424 can be combined to form a predicted 3D pose for a vehicle and output the 3D pose to computing device 115 for storage and recall for use in operating vehicle 110. For example, information regarding location and pose for a vehicle in a field of view of a video sensor 116 included in vehicle 110 can be used to operate vehicle 110 so as to avoid collisions or near-collisions with a vehicle in the field of view.

DNN 400 can be trained based on recorded input color video images 402 and corresponding ground truth regarding the 3D pose of vehicles included in input color video images 402. Input color video images 402 and corresponding ground truth can be obtained by recording real world scenes and measuring 3D pose, for example Techniques discussed herein can also obtain input color video images 402 and corresponding ground truth regarding the 3D pose of vehicles included in color video images based on computer simulations. A computing device can render color video images based on digital data describing surfaces and objects in photo-realistic fashion, to mimic real world weather and lighting conditions according to season and time of day for a plurality of vehicles, locations and poses. Because the color video images 402 can be synthetic, 3D pose of included vehicles is included in the digital data, so ground truth is known precisely, with no measurement error as is possible with real world data. Errors included in real world data can be included in the simulated data by deliberately adjusting the bounding box 306 by scaling or shifting for additional training, for example.

Computing device 115 can operate vehicle 110 based on a multi-level control process hierarchy wherein a plurality of cooperating, independent control processes create and exchange information regarding vehicle 110 and its environment including real world traffic objects to safely operate vehicle 110 from its current location to a destination, wherein safe operation of vehicle 110 includes avoiding collisions and near-collisions. Example techniques discussed herein allow for improved control processes to determine information regarding vehicle 110 operation, namely predicted 3D pose including orientation (roll, pitch, and yaw) and location (x, y, and z) of a traffic object (a vehicle) in the real world environment of vehicle 110. Other control processes can determine a destination in real world coordinates based on vehicle location information and mapping data. Further control processes can determine a predicted polynomial path based on lateral and longitudinal acceleration limits and empirically determined minimum distances for avoiding traffic objects which can be used by still further control processes to operate vehicle 110 to the determined destination. Still further control processes determine control signals to be sent to controllers 112, 113, 114 to operate vehicle 110 by controlling steering, braking and powertrain based on operating vehicle 110 to travel along the predicted polynomial path.

Techniques described herein for determining a predicted 3D pose for a vehicle included in a color video image can be included in a multi-level control process hierarchy by outputting predicted 3D pose information from DNN 400 to a control process executing on computing device 115 that determines predicts vehicle movement based on 3D pose with respect to vehicle 110 and a roadway including map information. Predicting movement for vehicles in a field of view of a color video sensor 116 can permit computing device 115 to determine a path represented by a polynomial path function that can be used by computing device 115 to operate vehicle 110 along to safely accomplish autonomous and semi-autonomous operation by predicting locations of other vehicles and planning the polynomial path accordingly. For example, computing device 115 can operate vehicle 110 to perform semi-autonomous tasks including driver assist tasks like lane change maneuvers, cruise control, and parking, etc.

Performing driver assist tasks like lane change maneuvers, cruise control, and parking, etc., can include operating vehicle 110 by determining a polynomial path and operating vehicle 110 along the polynomial path by applying lateral and longitudinal acceleration via controlling steering, braking and powertrain components of vehicle 110. Performing driver assist tasks can require modifying vehicle 110 speed to maintain minimum vehicle-to-vehicle distances or to match speeds with other vehicles to merge with traffic during a lane change maneuver, for example. Predicting movement and location for other vehicles in a field of view of sensors 116 included in vehicle 110 based on determining other vehicle pose and location in real world coordinates can be included in polynomial path planning by computing device 115. Including predicted pose and location in polynomial path planning can permit computing device 115 to operate vehicle 110 to perform vehicle assist tasks safely.

Figure 5:
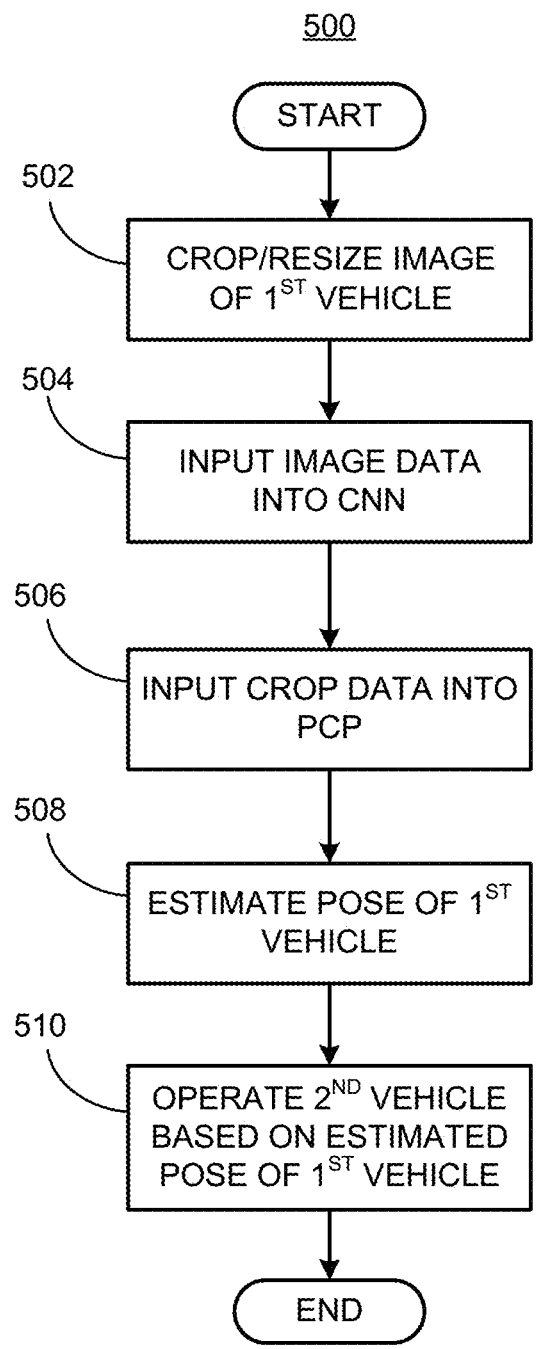
FIG. 5 is a flowchart diagram of an example process to estimate vehicle pose based on a cropped image.

FIG. 5 is a flowchart, described in relation to FIGS. 1-4, of an example process 500 for operating a second vehicle 110 based on predicting an estimated 3D pose for a first vehicle. Process 500 can be implemented by a processor of computing device 115, taking as input information from sensors 116, and executing commands and sending control signals via controllers 112, 113, 114, for example. Process 500 is described herein as including multiple steps taken in disclosed specified order. Other implementations are possible in which process 500 includes fewer steps and/or includes the disclosed steps taken in different orders.

Process 500 begins at step 502, where a computing device 115 included in a second vehicle 110 crops, resizes and pads a color image 402 that includes a representation of a first vehicle. As discussed in relation to FIGS. 3 and 4, above, the color image 402 is cropped to include only the image of the first vehicle, resized to fit an input size required by DNN 400, and padded to assist convolution by CNN 408.

At step 504 computing device 115 inputs the cropped, resized and padded image data into CNN 408, where CNN 408 processes the input cropped, resized and padded color image data to form image features 414 to output to CIP 418 as discussed above in relation to FIG. 4.

At step 506 computing device 115 inputs crop data including height, width and center of the cropped color image to PCP block 412 where the crop data is processed by a plurality of fully connected neural network layers to determine pose features 416 that describe a 3D orientation associated with the other vehicle represented in input color video 402.

At step 508 computing device 115 inputs image features 414 and pose features 416 into CIP block 418 where a plurality of fully connected neural network layers process the input image features 414 and pose features 416 to determine and output an orientation prediction 420 that describes the orientation of a vehicle represented in input color image 402 in degrees of roll, pitch, and yaw with respect to a color video sensor 116 3D coordinate system. Computing device also inputs crop information 410 to PCL block 422 which processes to crop information 410 to form a predicted 3D location 424. The predicted 3D location 424 and predicted orientation 420 can be combined to form a predicted 3D pose.

At step 510, computing device 115 operates a vehicle 110 based on the 3D pose prediction output at step 508. For example, computing device 115 can use the 3D pose prediction to predict movement of a vehicle in the field of view of a color video sensor 116 included in vehicle 110. Computing device 115 use the location and predicted movement of the vehicle in the field of view of color video sensor 116 in programs that plan polynomial paths for driver assist tasks, for example. Determination of a polynomial path for vehicle 110 to follow to accomplish a driver assist task including lane change maneuvers, cruise control, or parking, can be based, in part, on predicted movement of vehicles in the field of view of color video sensor 116. Predicting movement of vehicles in a field of view of a color video sensor 116 can permit computing device 115 to operate vehicle 110 so as to avoid collision or near-collision with another vehicle while performing driver assist tasks as discussed above in relation to FIG. 4, for example.

Figure 6:
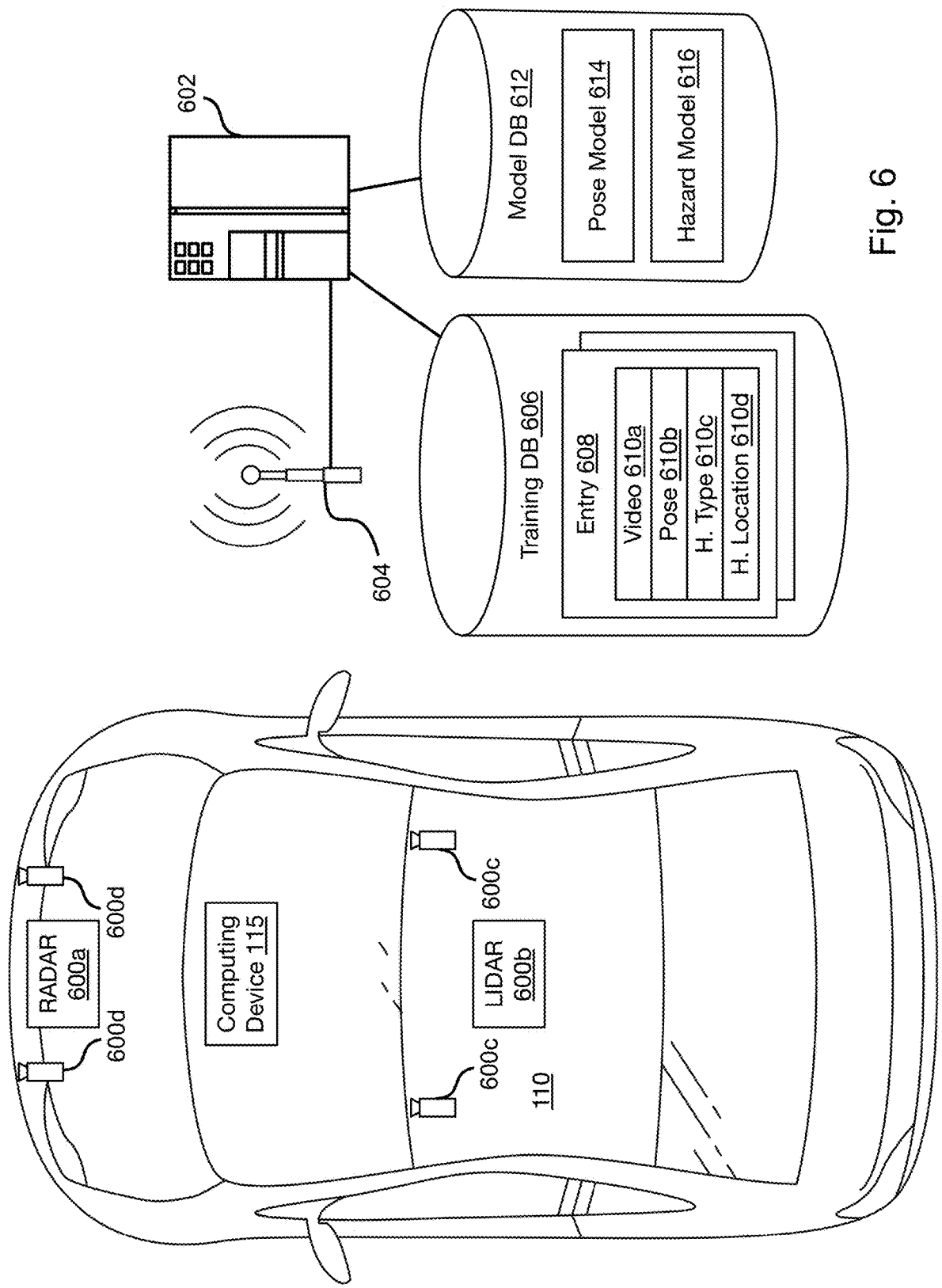
FIG. 6 is a block diagram of a system for generating and using a model trained to identify a type and location of a hazard according to the estimated vehicle pose.

Referring to FIG. 6, the sensors 116 of the vehicle 110 may include sensors such as a RADAR (radio detection and ranging) sensor 600a and a LIDAR (light detection and ranging) sensor 600b. The sensors 116 may further include high forward facing cameras 600c located above the hood of a vehicle 110 and possibly above the middle of the windshield of the vehicle 110, such as at the top of the windshield of the vehicle. For example, the cameras 600c may be located above the eye position of a driver, such as above a top of a steering wheel of the vehicle 110.

The sensors 116 may include low cameras 600d in addition to or as an alternative to the cameras 600c. The low cameras 600d may be located below the hood of the vehicle 110, such as by being mounted at a vertical position within the vertical extent of the grill of the vehicle. The illustrated positions of the cameras 600c, 600d are exemplary only and any position that is suitable for obtaining an image of other vehicles around the vehicle 110 may be used.

The RADAR sensors 600a, LIDAR sensor 600b, high cameras 600c, and low cameras 600d may be coupled to the computing device 115, which uses output of these sensors 600a-600d to record data for training purposes or for evaluation using a machine learning model generated according to the methods disclosed herein.

The computing devices 115 of one or more vehicles 110 may capture training data using sensors 600a-600d that is provided to a server system 602 for training a model according to the methods disclosed herein. Data may be transferred by means of a wireless antenna 604 with which the computing device 116 communicates using a wireless protocol or by means of a wired connection.

Another vehicle having some or all of the attributes of the vehicle 110 may likewise receive data describing a machine learning model from the server system 602 using a wireless or wired connection.

The server system 602 may host or access a training database 606. The training database 606 may store training data entries 608 that each include such information as a segment of video data 610a (e.g., a N minute segment from one or more of the cameras 600c, 600d, where N is a predefined length). The video data 610a may be augmented with LIDAR and/or RADAR data from the sensors 600a, 600b for that same N minute period as the video data 610a. In some embodiments, N is a value between 5 and 15. For example, a 10-minute segment may be used.

Each entry 608 may include a pose data 610b of a vehicle represented in the video data 610a, e.g. a vehicle traveling in front of or to the side of the vehicle 110 that captured the video data 610a ("the ego vehicle"). As discussed above, the pose may be determined for each frame of a video segment such that the pose data 610b includes a series of pose estimates corresponding to some or all of the frames of the video data 610a. The pose data 610b may be obtained according to the approach described above with respect to FIGS. 1 through 5. In some instances, pose data 610b is obtained by direct measurement, i.e., the other vehicle represented in the video data 610a may include sensor's measuring its pose and these outputs may then be used as the pose data 610b for training purposes.

Each entry 608 may further include annotations of one or both of a hazard type 610c and a hazard location 610d encountered by a vehicle represented in the video data 610a. For example, for some or a portion of the frames of the video data 610a, a type and a location of a hazard may be included. For example, every Mth frame in the sequence of frames of the video data 610a starting at a predefined point may be annotated with a location and/or hazard type, wherein M is a predefined integer greater than 2. The location may be indicated in two- or three-dimensional coordinates relative to the location of the vehicle 110 that captured the video data 610a. For example, the location may be expressed in the same coordinate system used to describe the three dimensional pose data 610b. The location and hazard type may be obtained by human curation. In an alternative, approach, real world locations of hazards may be observed and their type classified (e.g., pothole, ice, mud, gravel, bump, uneven road surface, dirt, stray objects etc.). Video data of vehicles traversing the hazards may be obtained while also recording the locations of the vehicles. The location of a hazard in a coordinate system defined relative to a vehicle may therefore be determined as a difference between the vehicle's location and the location of the hazard.

In order to train a model, there may be many hundreds, thousands, or hundreds of thousands of entries 608. The entries 608 may advantageously include many entries 608 corresponding to each type of hazard that is to be classified as well as a range of relative locations for each type of hazard.

Note that in order to properly train the model, some entries 608 may include frames of the video data 610a with no hazard present and may be annotated to indicate this fact. In this manner, a machine learning model trained using the entries 608 to both identify whether a hazard is present and the type of a hazard if present.

The server system 602 may host or access a database 612 storing a pose model 614, e.g. a model 614 trained to identify the pose of a vehicle from video data according to the approach of FIGS. 1 through 5. The database 612 may further store a hazard model 616 trained to identify the type and/or location of a hazard based on change an observed vehicle's pose over time. The pose model 614 and hazard model 616 may be loaded onto a vehicle having some or all of the attributes of the vehicle 110 for purposes of identifying and avoiding hazards as discussed below. The server system 602 may communicate with the vehicle 110 by means of a wireless antenna 604 or a wired connection.

Figure 7:
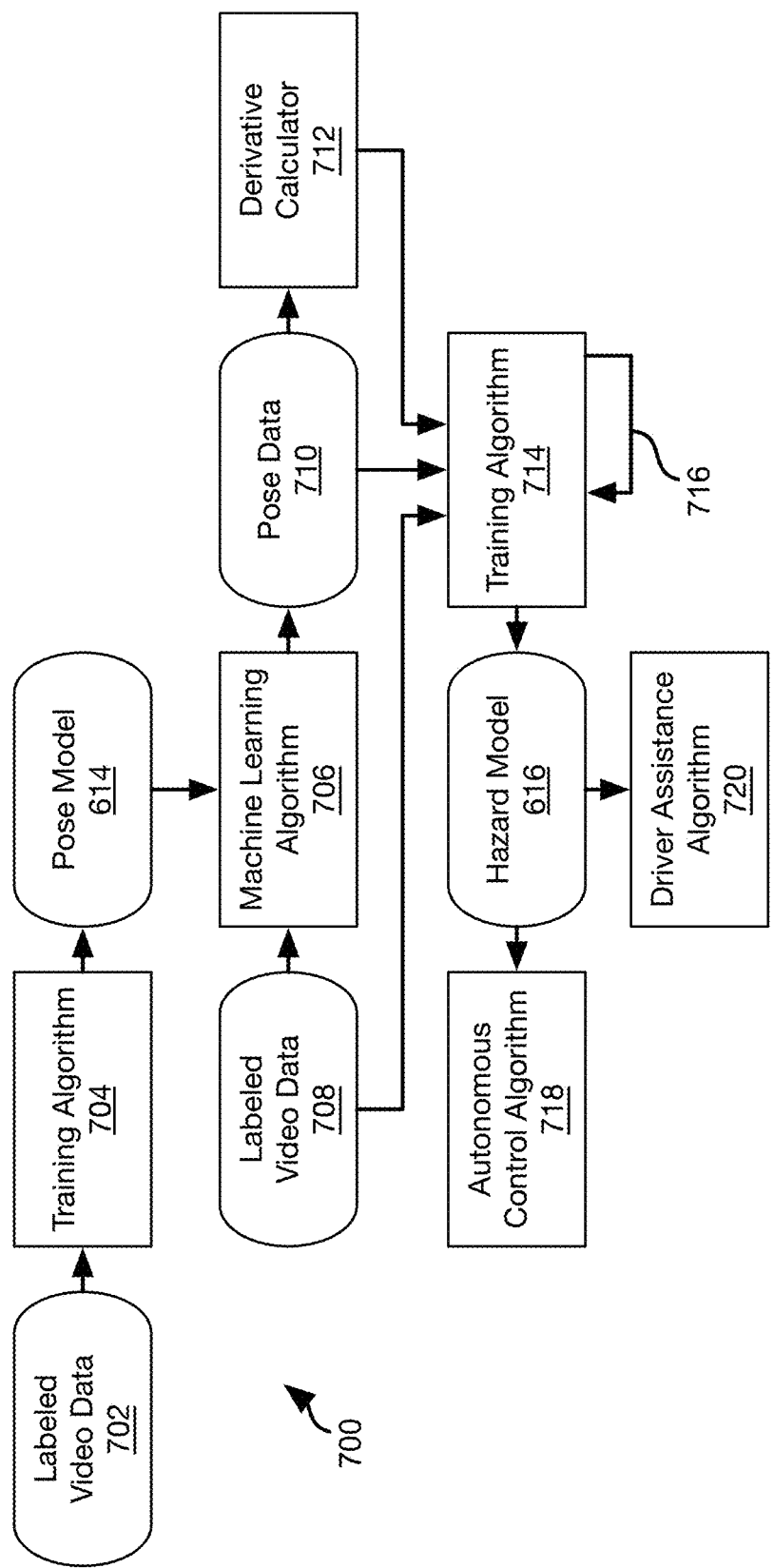
FIG. 7 is a block diagram illustrating components for training a model to identify the type and location of a hazard according to the estimated vehicle pose.

FIG. 7 illustrates an example approach 700 for training the hazard model 616. Labeled image or video data 702 is input to a training algorithm 704 that trains the pose model 614 to recognize the pose of a vehicle from image or video data. The training algorithm 704 may train the pose model 614 using the labeled video data 702 using the approach described above with respect to FIGS. 1-5.

A machine learning algorithm 706 may process labeled video data 708 using the pose model 614 to obtain pose data 710. The labeled video data 708 may include training entries 608 including some or all of the data 610a-610d. Where the pose model 614 is used to identify the pose of vehicles in frames of video data 610a, the pose data 610b may be omitted from the training entries 608. Note also that where the training entries 608 include pose data 610b the step of obtaining pose data 710 using the pose model 614 may be omitted and the pose data 610b will be used as the pose data 710 as described below. Where the training entries 608 are labeled with pose data 610b, the labeled video data 608 may be used in place of the labeled video data 702 to train the pose model 614.

The pose data 710 (from pose data 610b of training entries 608 or derived with the model 614) may be input to a derivative calculator 712 that calculates series of first derivatives of some or all of the x, y, z, pitch, yaw, and roll values of a series of pose estimates for each video segment. In some embodiments, the derivative calculator 712 also calculates a series of second derivatives for the series of x, y, z, pitch, yaw, and roll values of the series of pose estimates.

The pose data 710 and derivatives of the pose data may be input to a training algorithm 714. The training algorithm 714 may further take as input the labeled video data 708. In some embodiments, the training algorithm 714 operates exclusively on pose data 610b as the input and the hazard type data 610c and the hazard location data 610d as the desired output. In other embodiments, images of the video data 610a will also be provided as an input used by the training algorithm 714 to train it to obtain the desired output. In some embodiments, RADAR and LIDAR outputs from entries 608 may also be used to train the hazard model 616

In some embodiments, the training algorithm 714 is a recurrent neural network which provides a feedback path 716. For example, the training algorithm 714 may define a recurrent neural network in combination with a deep neural network. A loss function may be calculated with respect to an output of the deep neural network, e.g. a difference between an output of the deep neural network for input data of an entry 608 (and possibly the derivatives from derivative calculator 712) and the desired output 610c, 610d of that entry 608. This loss function may then be used to tune the weights of the deep neural network in order to drive the loss function toward zero.

The result of the training algorithm 714 is a hazard model 616 that is trained to output for pose data and its derivatives (either with or without the video data, LIDAR data, and/or RADAR data used to generate the pose data as perceived by cameras 600c, 600d of an ego vehicle) whether a hazard is present and, if so, a type of the hazard and its location relative to the ego vehicle.

The hazard model 616 may be loaded into an autonomous control algorithm 718 of a vehicle for use in identifying and avoiding hazards. The hazard model 616 may also be loaded into a driver assistance module 720 of a vehicle for use in generating alerts to a driver.

Figure 8:
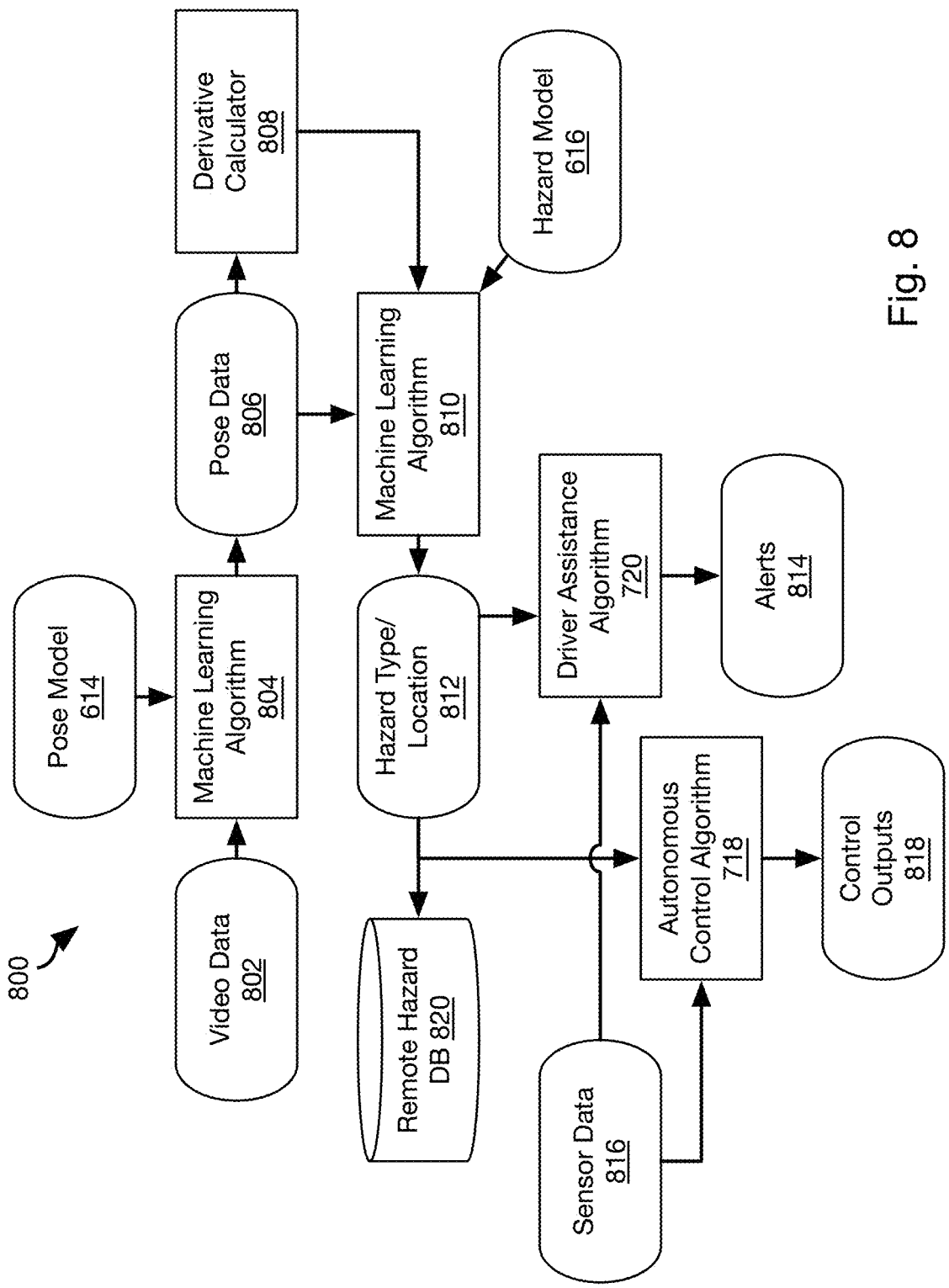
FIG. 8 is a block diagram illustrating components for using the model to identify the type and location of a hazard according to the estimated vehicle pose.

FIG. 8 illustrates an approach 800 for using the pose model 614 and hazard model 616 by a vehicle, such as vehicle having some or all of the attributes of the vehicle 110. As shown, video data from one or more of the cameras 600c, 600d, and possibly LIDAR and RADAR data from sensors 600a, 600b, is input to a machine learning algorithm 804 that processes the video data using the pose model 614 to obtain vehicle pose estimates according to the pose model 614. The machine learning algorithm 804 may process the pose model to generate a pose estimate according to the approach described above with respect to FIGS. 1 through 5.

The output of the machine learning algorithm is pose data 806 that is a series of pose estimates, each pose estimate corresponding to an image frame of the video data 802. The pose data 806 may be input to a machine learning algorithm 810 that processes the pose data 806 according to the hazard model 616. The machine learning algorithm may further take as inputs derivatives of the pose estimates from a derivative calculator 808. As discussed above, a pose estimate may include x, y, z, pitch, yaw, and roll. Accordingly, a series of pose estimates may be used to calculate a series of first and/or second derivatives of these values that are input with the pose estimate to the machine learning algorithm 810.

The machine learning algorithm 810 may be embodied as the trained recurrent neural network as described above with respect to the training algorithm 714. As noted above, the hazard model may also take the video data 802 as an input along with the pose estimate.

The outputs of the machine learning algorithm 810 is hazard data 812 including estimates of whether a hazard is indicated by a pose estimate and, if so, a location and type of that hazard. The recurrent neural network implemented by the hazard model 616 and machine learning algorithm 810 may have a memory or look-back such that particular hazard estimate for a pose estimate is also a function of multiple preceding pose estimates, such as multiple contiguous preceding pose estimates.

Once the type and location of a hazard is known, this information may be used by an autonomous control algorithm 718. The autonomous control algorithm 718 may use a hazard estimate as an input along with sensor data 816 from some or all of the sensors 600a-600d and possibly other sensors. The autonomous control algorithm 718 may perform functions such as autonomous trajectory determination and traversal while performing obstacle identification and obstacle avoidance according to any approach for performing these functions as known in the art. Accordingly, the locations of hazards determined using the hazard model 616 may be avoided using the algorithm 718. The autonomous control algorithm 718 produces control outputs 818 to controls of a vehicle, such as an accelerator input, brake input, steering input in order to perform trajectory traversal and object avoidance.

Accordingly, once the location and type of a hazard is identified, the autonomous control algorithm 718 may take actions to mitigate danger caused by the hazard. For example, where a hazard is classified as a pothole, the autonomous control algorithm 718 may swerve to avoid the location of the pothole or slow down if swerving is not possible. Where a hazard is classified as ice, the autonomous algorithm 718 may likewise slow down, redistribute torque to wheels that are not going to cross the location of the ice, swerve around the location of the ice, or perform other actions.

As an alternative, the hazard type and location may be provided to the driver assistance algorithm 720. The driver assistance algorithm 720 may response to the type and location of the hazard by outputting an alert 814. For example, a voice alert may communicate the hazard and possibly its location to the driver (e.g., "pothole on left").

In some embodiments, the type and location of hazards may be communicated to a remote hazard database 820. The contents of the database may be distributed to vehicles. Accordingly, autonomous vehicles may use this data to avoid streets with hazards or to avoid hazards by swerving or otherwise planning trajectories that do not pass the vehicle's tires over the hazard location. Likewise, driver assistance algorithms 720 may warn a driver of hazards using the distributed data.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, DRAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising, by a computer system:
receiving training data entries, each entry including a video segment annotated with a vehicle pose and a hazard type;
training a first deep neural network (DNN) to output vehicle pose estimates according to the training data entries;
training a second DNN using the training data entries to classify a hazard according to the vehicle pose estimates; and
training the second DNN using the training data entries to identify a location of the hazard according to the vehicle pose estimates and derivatives of the vehicle pose estimates.

2. The method of claim 1, wherein the vehicle pose estimates each include x, y, z, pitch, yaw, and roll estimates.

3. The method of claim 1, wherein the second DNN is a recurrent neural network.

4. The method of claim 1, wherein training the second DNN using the training data entries to classify the hazard according to the vehicle pose estimates comprises training the second DNN to classify the hazard as at least one of a pothole, ice, mud, gravel, a bump, an uneven road surface, dirt, and a stray object.

5. The method of claim 1, further comprising programming a vehicle controller to use the first DNN and the second DNN for hazard detection.

6. A system comprising one or more processing devices and one or more memory devices coupled to the one or more processing devices, the one or more memory devices storing executable code effective to cause the one or more processing devices to:
receive training data entries, each entry including a video segment annotated with a vehicle pose and a hazard type;
train a first deep neural network (DNN) to output vehicle pose estimates according to the training data entries; and
train a second DNN to classify a hazard according to the training data entries and the vehicle pose estimates,
wherein the executable code is further effective to cause the one or more processing devices to train the second DNN using the training data entries to identify a location of the hazard according to the vehicle pose estimates, and derivatives of the vehicle pose estimates.

7. The system of claim 6, wherein the vehicle pose estimates each include x, y, z, pitch, yaw, and roll estimates.

8. The system of claim 6, wherein the second DNN is a recurrent neural network.

9. The system of claim 6, wherein the executable code is further effective to cause the one or more processing devices to train the second DNN using the training, data entries to classify the hazard according to the vehicle pose estimates by training the second DNN to classify the hazard as at least one of a pothole, ice, mud, gravel, a bump, an uneven road surface, dirt, and a stray object.

10. The system of claim 6, wherein the executable code is further effective to cause the one or more processing devices to program a vehicle controller to use the first DNN and the second DNN for hazard detection.

11. A method comprising, by a computer system:
receiving training data entries, each entry including a video segment captured by a camera mounted to a first vehicle and annotated with a vehicle pose of a second vehicle visible in the video segment and a hazard type being encountered by the second vehicle visible in the video segment;
training a first deep neural network (DNN) using the training data entries to output a vehicle pose estimate for a third vehicle visible in video data captured by a camera mounted to a fourth vehicle; and
training a second DNN using the training data entries to classify a hazard encountered by the third vehicle according to the vehicle pose estimate for the third vehicle.

12. The method of claim 11, further comprising training the second DNN using the training data entries to identify a location of the hazard encountered by the third vehicle according to the vehicle pose estimates.

13. The method of claim 11, further comprising training the second DNN using the training data entries to identify a location of the hazard according to the vehicle pose estimates and derivatives of the vehicle pose estimates.

14. The method of claim 11, wherein the vehicle pose estimate each include x, y, z, pitch, yaw, and roll estimates.

15. The method of claim 11, wherein the second DNN is a recurrent neural network.

16. The method of claim 11, wherein training the second DNN using the training data entries to classify the hazard according to the training data entries comprises training the second DNN to classify the hazard as at least one of a pothole, ice, mud, gravel, a bump, an uneven road surface, dirt, and a stray object.

17. The method of claim 11, further comprising programming a vehicle controller to use the first DNN and the second DNN for hazard detection.

* * * * *

UNITED STATES PATENT AND TRADEMARK OFFICE
CERTIFICATE OF CORRECTION

PATENT NO. : 10,853,670 B2
APPLICATION NO. : 16/198334
DATED : December 1, 2020
INVENTOR(S) : Sholingar et al.

Page 1 of 1

It is certified that error appears in the above-identified patent and that said Letters Patent is hereby corrected as shown below:

In the Claims

Column 21 In Claim 5, delete "fOr" insert --for--.

Signed and Sealed this
Twenty-second Day of June, 2021

Drew Hirshfeld
*Performing the Functions and Duties of the
Under Secretary of Commerce for Intellectual Property and
Director of the United States Patent and Trademark Office*